Nov. 26, 1968    C. E. YOST    3,413,429
AUTOMATIC PUMP CONTROL
Filed May 8, 1967    2 Sheets-Sheet 2

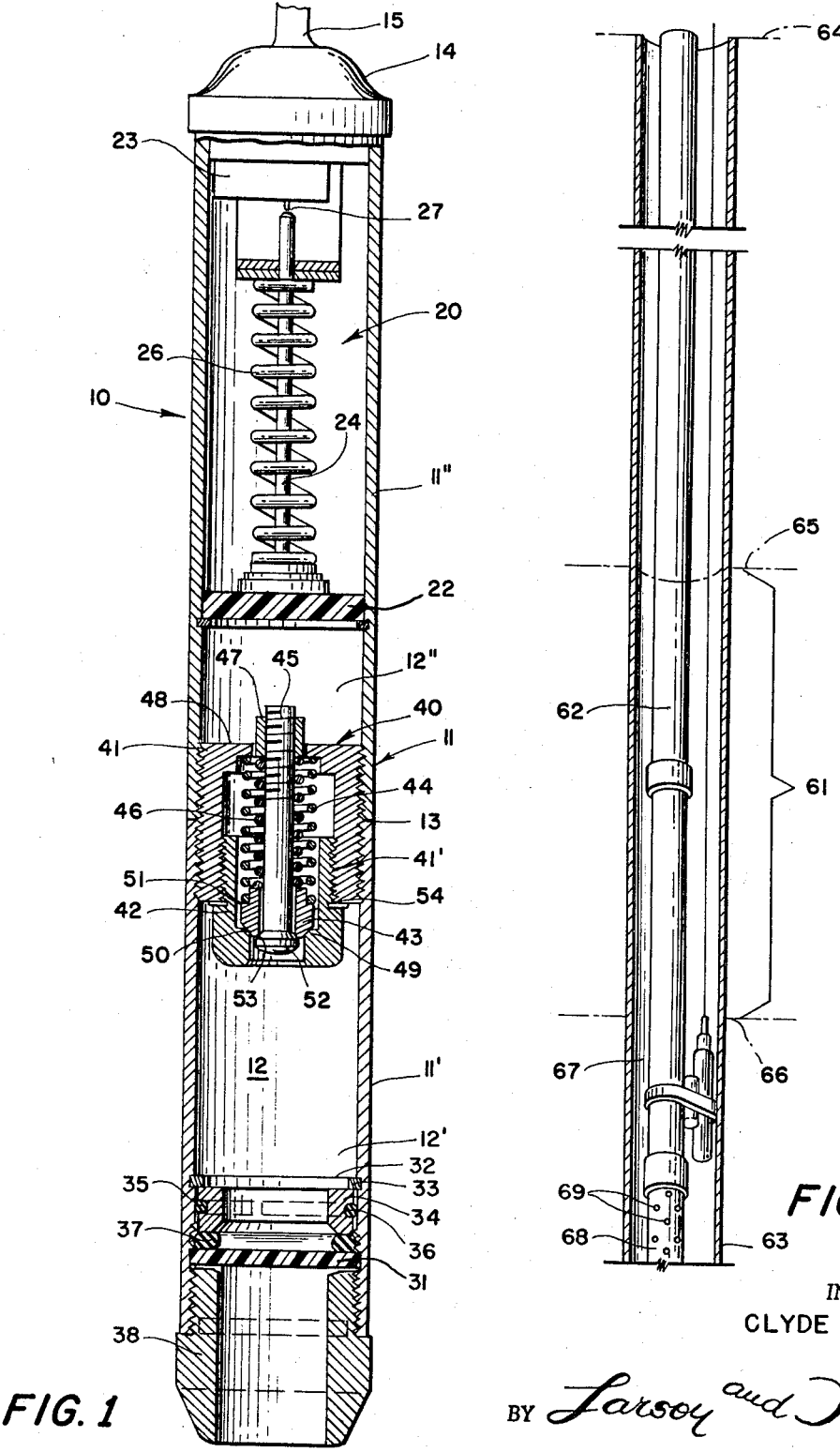

INVENTOR
CLYDE E. YOST

BY Larson and Taylor
ATTORNEYS

United States Patent Office 3,413,429
Patented Nov. 26, 1968

3,413,429
AUTOMATIC PUMP CONTROL
Clyde E. Yost, 700 S. Villa Drive,
Evansville, Ind. 47714
Continuation-in-part of application Ser. No. 439,324,
Mar. 12, 1965. This application May 8, 1967, Ser.
No. 636,764
3 Claims. (Cl. 200—83)

ABSTRACT OF THE DISCLOSURE

An automatic pressure control unit for turning on and off a pump for a well when the fluid in a well is above a predetermined maximum level and below a predetermined minimum level respectively. The pressure of the head of fluid is transmitted through a diaphragm to a valve system in a sealed chamber in the device to operate an electrical switch which, in turn, controls the pump.

Cross reference to related applications

The present invention is a continuation-in-part of my co-pending application Ser. No. 439,324, filed Mar. 12, 1965, now Patent No. 3,318,247, issued May 9, 1967.

Background of the invention

The present invention relates to a switching device which opens and closes an electrical circuit in response to a change in fluid pressure of predetermined values. In another aspect it relates to a switching device to control the pumping of fluids by automatically deactivating a pump when a low level of fluid height is reached, and automatically allowing a pump to be activated when a high level of fluid height is reached. The invention is applicable to the pumping of fluids from an oil well.

In my prior application there is disclosed a device for closing and opening an electrical switch when the fluid level in the well reaches a predetermined high level and a predetermined low level respectively. My previously disclosed device included first valve means to permit the exterior fluid to enter the device at a preset pressure level and act directly against a diaphragm controlling a pressure-sensitive switch. Upon the closing of the pressure-sensitive switch the pump is actuated and a solenoid valve is energized to open a second passageway for the exterior fluid to act against the diaphragm of the pressure sensitive switch. As soon as the pump commences operation and the pressure level of the exterior fluid decreases slightly, the first valve means closes but the exterior fluid continues to act against the diaphragm of the pressure-sensitive switch through the second passageway until the pressure level of the exterior fluid drops to the point where it is insufficient to maintain the pressure switch closed. At that point the pressure switch opens, deactivating the pump and closing the solenoid valve. By this means the level of the fluid in a well may be controlled so that it will not rise above a level determined by the pressure setting of the first valve means nor will the level of the fluid drop below a level determined by the pressure setting of the pressure sensitive switch.

Summary of the invention

The present invention achieves substantially the same objectives as the device disclosed in my prior application in that it provides a device for actuating a pump when the fluid in a well reaches a predetermined high level and for continuing operation of the pump until the fluid in the well reaches a lower level. However, according to the present invention the device is completely sealed so that the exterior fluid cannot enter the device but acts against a first diaphragm forming an external wall of the sealed unit. The sealed unit includes two chambers with valve means disposed in the partition separating the chambers. The first diaphragm against which the exterior fluid acts forms one wall of one chamber and a second diaphragm for a pressure sensitive switch forms a wall of the second chamber. Normally both chambers are filled with a liquid with the pressure balanced therebetween. When the pressure of the exterior fluid reaches a predetermined level, this pressure acting against the first diaphragm causes the pressure in the fluid in the first chamber to reach a level sufficient to open the main valve in the partition so that some of the fluid in the first chamber passes into the second chamber, distorting the first diaphragm inwardly. By this means the volume of fluid and pressure in the second chamber is raised to distort the diaphragm of the pressure-sensitive switch, thus closing the switch and actuating the pump. The pump commences operation to reduce the level of the exterior fluid thereby decreasing the pressure on the first diaphragm and resulting in closing the valve means in the partition. However, the additional fluid which passed from the first chamber into the second chamber remains trapped in the second chamber, thus maintaining the pressure sensitive switch closed. A second, bleed-off, valve is provided in the partition to permit the return of the fluid from the second chamber to the first chamber. As the first diaphragm returns to normal position the pressure in the first chamber is reduced so that the fluid pressure in the second chamber is sufficient to overcome the force of the spring of the bleed-off valve and open this valve. When the fluid in the chambers is balanced the pressure switch is opened thus terminating operation of the pump. According to the present invention the strength of the spring of the bleed-off valve determines the length of time the pump is in operation. Actuation of the pump is initiated by the pressure of the exterior fluid and may be preset by adjusting the spring force on the main valve in the partition.

The present invention comprises a sealed unit preventing entry of sediment and grit which can cause any moving and stationary parts to become clogged, gummed or sludged. Except for the very minor movement of the valves and the microswitch plunger the invention has no moving parts. In addition, because of the compactness and unitary structure of the instant invention, the unit can be manufactured less expensively and can be transported from one location to another with ease, allowing maximum use of each individual control unit. Its light weight, only 9 oz. including the fluid it is filled with, allows the unit to be suspended by only its two-wire electrical cable which can therefore be lighter and less costly. Furthermore the invention can operate in a 24 volt system, a desirable safety feature for any downhole instrument, especially where salt water may be encountered.

Finally, the construction and operation of the invention is such that the control unit may be installed after the oil piping has been set in the oil well casing without going through the expensive and time-consuming operation of pulling the piping to make the installation.

Thus it is among the objects of this invention to provide an automatic control for a pump which will cyclically allow the activation of a pump when the fluid to be pumped reaches a predetermined high level and will continue operation of the pump for a predetermined time period until the fluid to be pumped reaches a lower level.

Another object is to provide an automatic pump control device which is small is size, light in weight, simple in construction, mechanically sound and long lasting.

Another object is to provide an automatic pump control which operates with only minor movement of parts and consequently is free from malfunction due to wear.

Another object is to provide an automatic pump control for downhole use which operates on 24 volt electricity.

A further object is to provide an automatic pump control device which is comparatively inexpensive, compact and easily transported.

Another object is to provide an automatic pump control device for an oilwell which can be simply installed in the well after the piping has been placed in the well without the necessity of pulling the piping.

Other objects and many of the attendant advantages of the present invention will become more readily apparent upon consideration of the following detailed specification when considered in connection with the accompanying drawings.

*Brief description of the drawings*

FIG. 1 is a side view, partially in section, of an embodiment of the pressure control unit of the instant invention;

FIG. 2 is a perspective view of the embodiment of FIG. 1 mounted on the working barrel of an oil well inside the well casing with the well casing partially cut away;

*Description of the preferred embodiment*

Figure 3:
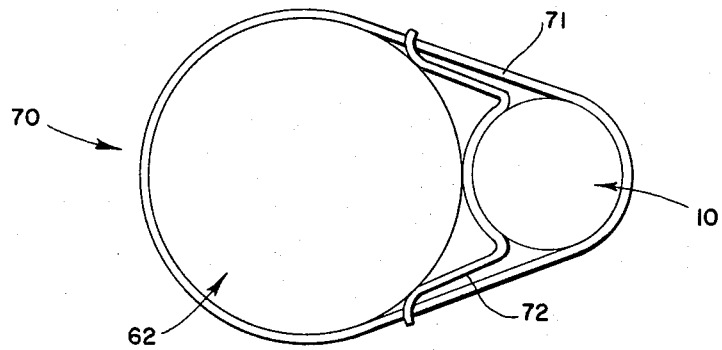
FIG. 3 is a cross-sectional view of the embodiment of FIG. 1 mounted on the working barrel of an oil well.

Referring now to the drawing, as shown in FIG. 1 the switching device 10 comprises a casing 11, illustratively a cylindrical body, sealed at both ends and containing an electrical switching system 20 and a pressure control system 40 through which the pressure from an exterior fluid is transmitted.

Casing 11 comprises two cylindrical members 11' and 11" joined at 13. The top of casing 11 is sealingly closed by a top fitting 14 into which has been sealed a two-wire cable 15.

Included within the casing 11 and positioned immediately below top fitting 14 is the electrical switching system 20. The switching system is actuated by means of a diaphragm 22 which sealingly closes off the top part of the casing. Diaphragm 22 may be made of any durable, resilient material, for example, Buna-N rubber. A slight depression in the diaphragm 22 will be transmitted by means of the mechanical linkage 24, to the contact head 27 of the microswitch 23 causing the normally open microswitch to be actuated, or closed. The microswitch 23 is electrically connected by means of an insulated lead and a casing ground contact to an appropriate control circuit, for example, the circuit 80 of FIG. 4, whereby when the switch 23 is closed the control circuit is energized.

At the bottom of casing 11 a second diaphragm 31, similar to diaphragm 22, which sealingly closes off the bottom of the casing and, with casing 11 and top diaphragm 22, defines an interior fluid chamber 12. To hold diaphragm 31 in position a split ring 32 is first inserted into an annular depression 33 on the inside surface of casing 11. An annular member 34 containing O-ring 35 in an annular depression 36 abuts split ring 32. Adjacent to member 34 is positioned a second O-ring 37 with the bottom diaphragm 31 positioned adjacent to O-ring 37. a short, pipe-like bottom end-fitting 38 is screw-threaded onto the bottom end of casing 11', the end-face of fitting 38 abutting the bottom face of diaphragm 31 to hold it in position.

Located within the interior fluid chamber 12 is pressure control system 40. Pressure control system 40 comprises an internally flanged cylindrical housing 41 which is screw-threaded to join both members 11' and 11" of casing 11. Concentrically arranged within housing 41 are valve-seating member 42 threadedly attached to housing 41 by threads at 41', a first spring-loaded valve 43 with spring 44, and a second spring loaded valve 45 with its weaker spring 46 and threaded securing means 47. As can be seen in FIGURE 1 an annular flange 48 projects radially inwardly from the top of the cylindrical housing 41. Valve seating member 42 has a corresponding flange 49 projecting radially inwardly which is beveled to form a seat 50 for the first valve 43. Valve 43 is generally annular and is forced downward by spring 44 acting on supporting face 51 of valve 43. The second valve 45 is a threaded rod having at one end an enlarged head 52 with a beveled face 53 which abuts a correspondingly bevelled face of valve 43. Spring 46 is supported between face 54 of valve 43 and member 47 which is threaded onto valve 45. By virtue of the threaded engagement between housing 41 and valve-seating member 42 the control member is made adjustable. In the preferred embodiment spring 44 is selected to be strong enough to counteract a column of fluid of from 25 to 50 feet or from approximately 10.8 to 21.6 lbs. Spring 46 is selected to be just strong enough to close the valve at seat 50.

In operation, chamber 12 is filled with a sensitizer fluid which can be a light grade of oil and generally noncompressible. The pressure of springs 44 and 46 is also adjusted to the desired degree. As the head of exterior fluid rises, the pressure acting on the bottom diaphragm 31 will increase tending to depress it. As the pressure increases it is transmitted to the face of main valve 43. At this time the pressure in chamber 12' is greater than in chamber 12". When the pressure on valve 43 is great enough to overcome the force of spring 44, fluid from chamber 12' will leak upward into chamber 12", balancing the pressure in the two chambers. The increased pressure in chamber 12" will cause the upper diaphragm 22 to depress slightly, triggering the pumping action as microswitch 23 is mechanically closed. Valve 43 will be held open as long as the pressure in chamber 12' is able to overcome the pressure on the opposite side of valve 43, i.e., the combined effect of the weight of the fluid in chamber 12", the pressure of the fluid in chamber 12", the spring effect of diaphragm 22 and also spring 44. As the pressure in the exterior fluid is reduced due to the pumping action, the pressure on diaphragm 31 will be reduced, correspondingly reducing the fluid pressure in chamber 12' acting on valve 43 and allowing valve 43 to close.

As the pumping of the exterior fluid continues the pressure against diaphragm 31 will be reduced further, again causing an imbalance in the pressure in chambers 12' and 12". The greater pressure in chamber 12" will act to overcome the force of spring 46 and the pressure of the fluid in chamber 12', thereby causing bleed-off valve 45 to open. Fluid from chamber 12" will pass through valve 45 and into chamber 12'. As the pressure in the two chambers again balances itself, the pressure acting against diaphragm 22 will decrease until it can no longer overcome the force of spring 26 to maintain the microswitch 23 in a closed position, and the pump will be turned off.

When the pressure control unit 10 is to be used in an oil well for controlling an oil pump, it can be mounted on the working barrel 62, as shown in FIGURE 2 and FIGURE 3 by means of a saddle clamping system 70, if the piping has not yet been set in the well. A saddle clamp 72 is furnished to rigidly align the two round surfaces of the control unit 10 and the working barrel 62 to hold them in proper position. A standard band clamp 71 securely attaches the control unit 10 to the working barrel 62.

In many shallow wells if the oil well has been completed and the piping has already been installed, the pressure control unit 10 is suspended on the two-wire cable 15 and lowered into the hole to the proper depth by feeding the cable into the oil well casing 63. The pressure control unit 10, being very light in weight, may be suspended merely by the two-wire cable 15.

Additionally the desired low level of the pumping action can be determined by lowering the unit 10 into the well until the well pumps off, i.e., until the fluid has reached a low level where air is being drawn into the top hole 69 of the perforated nipple 68. The control unit 10 can then be raised slightly and be left there for operation, thus preventing the pumping action from continuing when the fluid has been exhausted and causing damage to the downhole equipment due to undue wear.

The position of the unit can be adjusted to a point where the pumping action will be stopped when the fluid reaches the formation and stopped at that level. This protects the formation by keeping it submerged at all times.

The unit 10 can even be used as a probe. Thus, if one were to immerse the unit in the fluid deeply enough to activate the switch 23, and then raise the unit 10 until the switch 23 deactivated, the length of cable 15 then in the hole would represent the low-ground-level depth of the fluid. In other words, by familiarity with the device, the control unit 10 can be used to great advantage. Similarly, the unit can be used as a fluid level finder to locate the level of the fluid in the hole. It can also be used to determine the amount of fill-up over a given period such as 6, 12 or 24 hours depending on the condition of the well. The unit is truly an "underground periscope" when used in any of these ways.

By utilizing the simple adjustable feature of the pressure control system 40, the control unit can be programmed for any fluid height or "head" 61 desired. At the time of fabrication of the pressure control unit 40, the pressure of the springs 44 and 46 applying pressure on the valves 43 and 45 can be approximately set to a desired column height for threshold pressure range. The unit 10 can then, in the field or "on site," be exactly adjusted with simple tools for the precise column heights 61 desired and adjusted for the environmental conditions at the site, e.g., the density of the fluids 67, the geothermal gradient, etc.

Because fluid does not flow through the unit 10, the control device can be filled at the time of fabrication with a fluid which is free from all foreign matter and is beneficial (good lubricating properties, rust preventive, spark-supressive, etc.) to the interior of the device.

Figure 4:
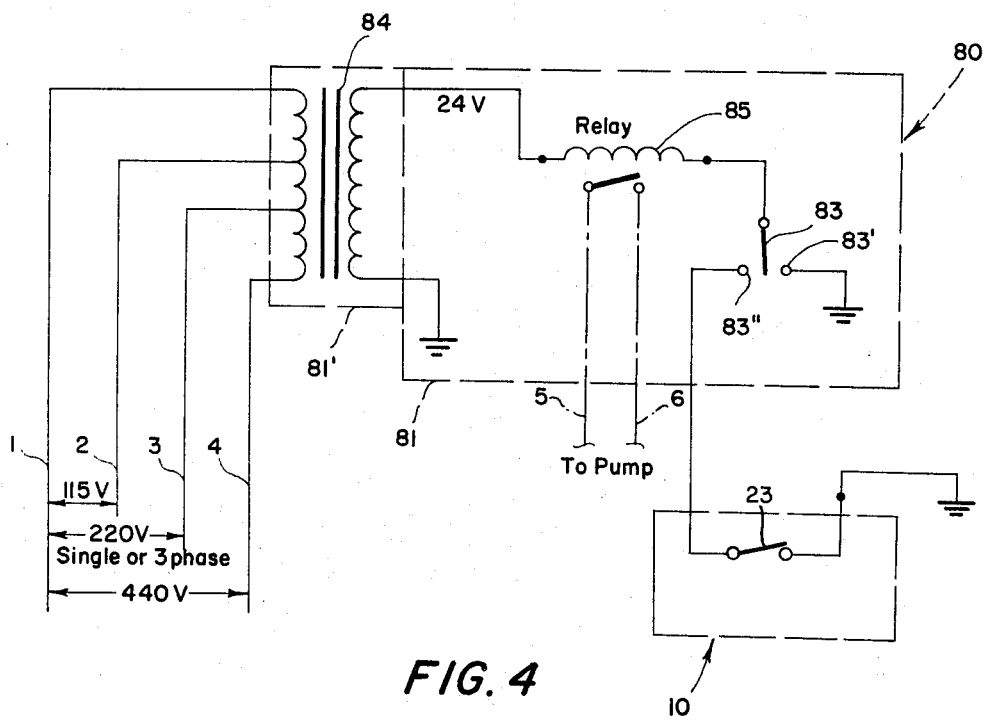
FIG. 4 is a schematic view of an electrical control circuit utilizable with the present invention.

A control circuit 80 which is utilizable with the control unit 10 when used to regulate a pump is shown in FIGURE 4. The electrical components are mounted in a control box 81 which is a standard metal box. The box 81 can be completely wired ready to be connected to the incoming power line (terminals 1, 2, 3 and 4) motor connection line (terminals 5 and 6), and the outgoing control line. A switch 83 is provided to observe and check the "downhole equipment." If the switch is placed in the "on" position 83' and no fluid is being pumped, it is an indication that the well is in need of attention as far as the "downhole equipment" is concerned. Placing the switch in the "auto" position 83" places the automatic pressure control unit in the circuit. A transformer 84 is placed in the control circuit to reduce to 24 volts the incoming source of 115 volts, 220 volts single or three phase, or 440 volts. A relay 85 is included which controls the pump motor relay circuit.

While in the foregoing specification, I have set forth certain details in structure and in steps as illustrating one embodiment and use of the invention, it will be understood that such details may be varied widely by those skilled in the art without departing from the spirit of my invention.

I claim:

1. An automatic pressure control unit for operating an electrical switch in response to changes in external fluid pressure acting on the unit comprising: an elongated cylindrical and generally thin walled container suitable for being placed into a vertically opened shaft such as an oil well or the like, a flexible upper diaphragm and a flexible lower diaphragm, each extending across the interior of said cylindrical container and forming with the interior walls of the said cylindrical chamber a sealed volume containing a sealed body of relatively incompressible fluid, an elongated valve unit removably affixed to the interior of said container between the upper and lower diaphragms for dividing said sealed volume into an upper chamber and a lower chamber, said valve unit including an outer annular seat rigid with the interior wall of the container, a first valve member cooperating with said first annular seat and a spring mounted in said valve unit and capable of holding said first valve member against said outer seat until the pressure of the liquid in the lower chamber reaches a predetermined level after which the first valve member separates from the outer seat to permit the flow of fluid from said lower chamber to said upper chamber, an inner annular valve seat formed on said first valve member, a second valve member acting against said inner valve seat, and a spring mounted in said valve unit coaxially with said first spring and capable of urging said second valve member against said inner annular seat until the pressure of the liquid in the upper chamber exceeds the pressure of the liquid in the lower chamber by a predetermined amount after which the second valve member separates from said inner valve seat to permit the flow of fluid from said upper chamber to said lower chamber, said lower diaphragm being exposed to an external body of fluid and capable of flexing in response to changes in pressure of said external body of fluid, and an electrical switch connected to said upper diaphragm to be closed upon flexing of the upper diaphragm when the liquid in the upper chamber exceeds a predetermined amount, said cylindrical container being separable at a point between said upper and lower diaphragms and including an externally threaded member for holding together the upper and lower portions of said cylindrical container on each side of said separation, and said valve unit being connected to the interior of said externally threaded member.

2. A control unit as claimed in claim 1 including a means for adjusting the force exerted by the second said spring upon the second valve member thereby establishing the said predetermined pressure at which the fluid in the upper chamber opens the second valve member.

3. A control unit as claimed in claim 1 wherein the said electrical switch is a pressure sensitive microswitch assembly.

References Cited

UNITED STATES PATENTS

| 2,530,285 | 11/1950 | Catranis | 137—493.6 |
| 2,842,160 | 7/1958 | Reyettye | 137—493.6 |
| 2,968,707 | 1/1961 | Martin et al. | 103—25 |
| 2,985,732 | 5/1961 | Russell | 200—83 |
| 3,091,085 | 5/1963 | Honodel | 200—83 |
| 3,132,592 | 5/1964 | Rudy et al. | 200—83 |
| 3,246,094 | 4/1966 | Zaske et al. | 200—83 |

WILLIAM L. FREEH, *Primary Examiner.*